United States Patent [19]

Jeong

[11] Patent Number: 5,467,086
[45] Date of Patent: Nov. 14, 1995

[54] APPARATUS AND METHOD OF CODING/DECODING VIDEO DATA

[75] Inventor: Jechang Jeong, Seoul, Rep. of Korea

[73] Assignee: Samsung Electronics Co., Ltd., Kyungki-do, Rep. of Korea

[21] Appl. No.: 78,343

[22] Filed: Jun. 18, 1993

[30] Foreign Application Priority Data

Jun. 18, 1992 [KR] Rep. of Korea .................. 1992 10614

[51] Int. Cl.⁶ .............................. H03M 7/00; H04N 7/12
[52] U.S. Cl. .............................................. 341/50; 348/415
[58] Field of Search ........................ 341/50, 76; 348/400, 348/401, 402, 409, 415, 416

[56] References Cited

U.S. PATENT DOCUMENTS

| | | | |
|---|---|---|---|
| 4,245,248 | 1/1981 | Netravali et al. | 358/136 |
| 4,554,670 | 11/1985 | Aiko et al. | 375/30 |
| 4,833,535 | 5/1989 | Ozeki et al. | 358/135 |
| 4,862,264 | 8/1989 | Wells et al. | 358/138 |
| 4,999,704 | 3/1991 | Ando | 358/133 |
| 5,315,326 | 5/1994 | Sugiyama | 348/415 |
| 5,337,086 | 8/1994 | Fujinami | 348/402 |

*Primary Examiner*—Marc S. Hoff
*Attorney, Agent, or Firm*—Sughrue, Mion, Zinn, Macpeak & Seas

[57] ABSTRACT

A method and apparatus for coding and decoding video data including a still image or active image on an intraframe basis. The coding system defines a search area composed of reconstructed data blocks and determines which one of the blocks within the search area has a pattern similar to a present data block that is in the process of being coded. The system then computes the amount of displacement between the present data block and the reconstructed data block from the search area that has a pattern very similar to that of the present data block. The coded data is then stored in memory or transmitted. The decoding system implements a reverse process of the coding system to decode the coded data based on the displacement vector.

21 Claims, 4 Drawing Sheets

| MODE | MINIMUM VALUE OF ENERGY DIFFERENCE | M-DV | | |
|---|---|---|---|---|
| PCM MODE | | 0 | | |
| DPCM MODE | $E_{E-A}$ | 1 | 0 | 0 |
| | $E_{E-B}$ | 1 | 0 | 1 |
| | $E_{E-C}$ | 1 | 1 | 0 |
| | $E_{E-D}$ | 1 | 1 | 1 |

APPARATUS AND METHOD OF CODING/DECODING VIDEO DATA

BACKGROUND OF THE INVENTION

The present invention relates to an apparatus and method for compressing and decompressing digital video data including still and active images. More particularly, the present invention relates to an apparatus and method for coding and decoding video data on an intraframe basis by detecting similar patterns in adjacent blocks of data.

The Korean Patent Application No. 10614 (Jun. 18, 1992) from which a claim to priority is made is incorporated herein by reference.

In general, video data systems employ coding/decoding systems for compressing both video and audio signals to reduce the amount of data to be transmitted and/or stored. The use of such coding/decoding systems continues to increase. The coding system codes the video and audio signal into digital data, which is then stored in a memory or transmitted to a receiver. The decoding system after receiving the coded data or retrieving the coded data from memory decodes the coded digital data to reconstruct the original video and audio signal. There are several methods known for implementing such coding/decoding techniques including DPCM (Differential Pulse Code Modulation), Vector Quantizer, and Variable Length Coding as examples. In effect, these methods remove redundant data in the video and audio signal, thus compressing the data.

Generally, in order to code a signal, each frame of video data is divided into blocks of a predetermined size. Each block of data or block of differential data is then transformed by an orthogonal transformation technique to produce transformation coefficients in the frequency domain. There are several known methods of implementing the orthogonal transformation technique including DCT (Discrete Cosine Transform), WHT (Walsh-Hadamard Transform), DFT (Discrete Fourier Transform), and DST (Discrete Sine Transform). The transformation coefficients, which are obtained by one of these transformation methods, are changed into predetermined representative values. The compressed data is then obtained based on statistical characteristics of the representative values.

FIG. 1 illustrates a general coder which includes an orthogonal transformer 11 for transforming input video data according to the DCT method and producing transformation coefficients, and a quantizer 12 for quantizing the transformation coefficients. A variable length coder 13 compresses the quantized data according to a variable length coding method. The output of the quantizer is further applied to a dequantizer 14 and inverse orthogonal transformer 15 in order to reconstruct frame data, which is stored in a frame memory 16. The reconstructed data is then applied to a motion estimation unit 17 and motion compensator 18 to produce a motion vector MV.

More specifically, video data of an N×N block size (generally represented as $N_1 \times N_2$ but for convenience $N_1=N_2=N$; N being a pixel unit) is inputted to an adder A1 via an input terminal 10. The block video data and feedback video data, which is applied to the second input of the adder A1, are combined to produce a block of differential data. The differential data is transformed into transformation coefficients in the frequency domain in accordance with a DCT method in the orthogonal transformer 11. The energy components of the transformation coefficients are gathered to a low frequency. A quantizer 12 changes the transformation coefficients into representative values which have a predetermined level, taking the energy level distribution of the transformation coefficients into consideration. A variable length coder 13 further compresses the transmitting data $V_{CD}$ through variable length coding of the representative values based on statistical characteristics of the representative values.

Generally, there are many similar portions between adjacent frames. In the case where a frame has slight movement relative to an adjacent frame, a motion vector MV is calculated by estimating the amount of motion between the two frames. The block of data is compensated using the motion vector MV to make the differential data small, and thus further compressing the data to be stored or transmitted. To produce such a motion vector, a dequantizer 14 and an inverse orthogonal transformer 15 dequantizes and inverse-transforms the quantization coefficients output from the quantizer 12, thereby transforming the video data back into the spatial domain. The inverse-transformed video data is reconstructed differential data corresponding to the differential data output from the first adder A1. The differential data output from the inverse orthogonal transformer 15 is added by adder A2 to block data fedback, and the sum is stored in a frame memory 16. The frame data is thus reconstructed. A motion estimation unit 17 compares the block data inputted via the input terminal 10 with the block of data stored in the frame memory 16, and calculates a motion vector MV representing motion between the two blocks. The motion vector MV is stored or transmitted to a receiver and is used in by the decoder to reconstruct the original data. The motion vector is also applied to a motion compensator 18, which is connected to frame memory 16 and motion estimation unit 17. The motion compensator 18 reads the N×N block of data from the frame memory 16 according to the motion vector MV supplied from the motion estimation unit 17, and supplies them to the first adder A1. As described above, the first adder A1 calculates the differential data between the N×N block data supplied from the input terminal 10 and the N×N block data supplied from the motion compensator 18.

With further reference to FIG. 1, when the two switches $RSW_1$, $RSW_2$ are turned on, the DPCM process is performed, and when the switches are turned off, the PCM (Pulse Code Modulation) data are output by the first and second adders A1, A2.

The coded video data $V_{CD}$ is stored or transmitted to the receiver. In either event, the coded data is applied to a decoder as shown in FIG. 2. The coded video data $V_{CD}$ is decoded through an inverse process of the variable length coding by a variable length decoder 21. The data output from the variable length decoder 21 is dequantized to produce transformation coefficients in the frequency domain by a dequantizer 22. An inverse orthogonal-transformer 23 transforms the transformation coefficients in the frequency domain supplied from the dequantizer 22 to video data in the spatial domain. The inverse-transformed video data is reconstructed to produce differential data corresponding to the differential data calculated by the first adder A1 of the coder. The motion vector MV, which is calculated by the motion estimation unit 17 of the coder, is supplied to a motion compensator 24 of the decoder. The motion compensator 24 reads the N×N block of data according to the motion vector MV from the frame data, which is stored in the frame memory 25, and supplies them to the adder A. Then, the inverse-transformed differential data and the N×N block of data supplied from the motion compensator 24 are combined by the adder A and transmitted to a display unit.

Accordingly, the coder and decoder process active images according to the DPCM method of motion compensation. For a still image or active image which is coded by intraframe coding, the above-described coder and decoder, including the orthogonal transformer 11, quantizer 12, and variable length coder 13 in the coder, and variable length decoder 21, dequantizer 22, and inverse orthogonal transformer 23 in the decoder are sufficient to perform the coding/decoding operation. For example, an electronic camera which uses a disk or a memory IC instead of conventional film, or a device for recording still images in a computer, utilizes a coder and decoder as described above. Incidentally, a still image has similar patterns among several blocks of a frame. For instance, a still image having the sky or sea in the background of a frame, a plurality of adjacent blocks will have similar pattern data.

However, since conventional coding/decoding systems as described above do not correlate among several blocks the similar patterns (e.g., a still image having the sky as background), there are several limitations which prevent the data from being compressed to a maximum.

SUMMARY OF THE INVENTION

It is, therefore, an object of the present invention to provide a coding and decoding method for DPCM data blocks for compressing the data prior to transmitting or storing the data which overcomes the above disadvantages and problems associated with conventional systems.

The above and other objects of the present invention are accomplished by providing a coder for compressing data including a block dividing means for dividing a frame of data into blocks of predetermined sizes, and outputting original data blocks, coding means, coupled to the block dividing means, for coding each of the original data blocks according to a predetermined algorithm, and outputting coded data blocks, reconstruction means, coupled to the coding means, for reconstructing each of the coded data blocks, and outputting reconstructed data blocks corresponding to the original data blocks, a frame memory, coupled to the reconstruction means, for storing a frame of data based on the reconstructed data blocks, search area determining means, coupled to the frame memory, for selecting a predetermined number of the reconstructed data blocks stored in the frame memory so as to define a search area, displacement estimation means coupled to the search area determining means for receiving the selected number of reconstructed data blocks, and coupled to the block dividing means for receiving a present data block, the displacement estimation means determining by estimation which one of the reconstructed data blocks has a pattern similar to the present data block, and calculating a displacement vector based on the estimation, displacement compensation means, coupled to the frame memory and to an output of the displacement estimation means, for receiving and outputting the data block from the frame memory having the pattern similar to the present data block based on the output of the displacement estimation means, a first adder, coupled to the block dividing means and the displacement compensation means, for calculating differential data based on the present data block and the data block output by the displacement compensation means, mode determining means, coupled to the first adder and the block dividing means, for determining a mode by comparing the present data block with the differential data, and outputting a corresponding mode value, and means, responsive to the mode value output by the mode determining means, for selecting one of the present data block and the differential data according to the mode value, and inputting the selected one of the present data block and the differential data to the coding means for coding.

Further in accordance with the above objects, the present invention provides a decoder for decoding data which has previously been coded by a coder, the coder outputting coded data blocks having been coded according to a predetermined coding algorithm, and a mode value and a displacement vector for data being coded based on a similarity between first and second data blocks. The decoder includes an input terminal for receiving the coded data blocks, the mode value, and the displacement vector, decoding means, coupled to the input terminal, for decoding the coded data blocks according to a predetermined algorithm, and outputting decoded data blocks, separation means, coupled to the input terminal, for separating the mode value and the displacement vector from the coded data blocks, switching means having first and second terminals, the switching means being responsive to the mode value, an adder having a first input coupled to an output of the decoding means and a second input coupled to the first terminal of the switching means, a second frame memory, coupled to an output of the adder, for storing a frame of data based on the decoded data blocks, and a displacement compensation means, coupled to an output of the separation means and the second frame memory, for receiving a data block from the second frame memory corresponding to the displacement vector received from the separation means, and applying the data block to the second terminal of the switching means, wherein the adder selectively adds the output data block from the displacement compensation means to an output of the decoding means in accordance with the mode value.

In further accordance with the above objects, the present invention provides a method for compressing data which includes the steps of dividing a frame of data into blocks of predetermined sizes, and outputting original data blocks, coding each of the original data blocks according to a predetermined algorithm, and outputting coded, data blocks, reconstructing each of the coded data blocks, and outputting reconstructed data blocks corresponding to the original data blocks, storing a frame of data based on the reconstructed data blocks, selecting a predetermined number of the reconstructed data blocks stored in the frame memory so as to define a search area, determining, by estimation, which one of the reconstructed data blocks has a pattern similar to a present data block, and calculating a displacement vector based on the estimation, electing, as a selected data block, the data block having the pattern similar to the present data block based on the displacement vector, calculating differential data based on the present data block and the selected data block, determining a mode by comparing the present data block with the differential data, and outputting a corresponding mode value, and coding one of the present data block and the differential data according to the mode value.

Even further, the present invention provides a method for decoding data which has previously been coded by a coder. The coder outputs coded data blocks having been coded according to a predetermined coding algorithm, and a mode value and a displacement vector for data being coded based on a similarity between first and second data blocks. The decoding method includes the steps of receiving the coded data blocks, mode value, and displacement vector, decoding the coded data blocks according to a predetermined algorithm, and outputting decoded data blocks, separating the mode value and the displacement vector from the coded data blocks, storing a frame of data based on the decoded data blocks in a frame memory, selecting a data block from the frame memory corresponding to the displacement vector, and adding, selectively in accordance with the mode value, the decoded data blocks to the selected data block to produce original data blocks.

BRIEF DESCRIPTION OF THE DRAWINGS

The objects and features of the present invention will be become more apparent from the consideration of the following detailed description taken in conjunction with the accompanying drawings in which.

DETAILED DESCRIPTION OF A PREFERRED EMBODIMENT

The preferred embodiments of the present invention will be described below with reference to the accompanying drawings.

Figure 1:
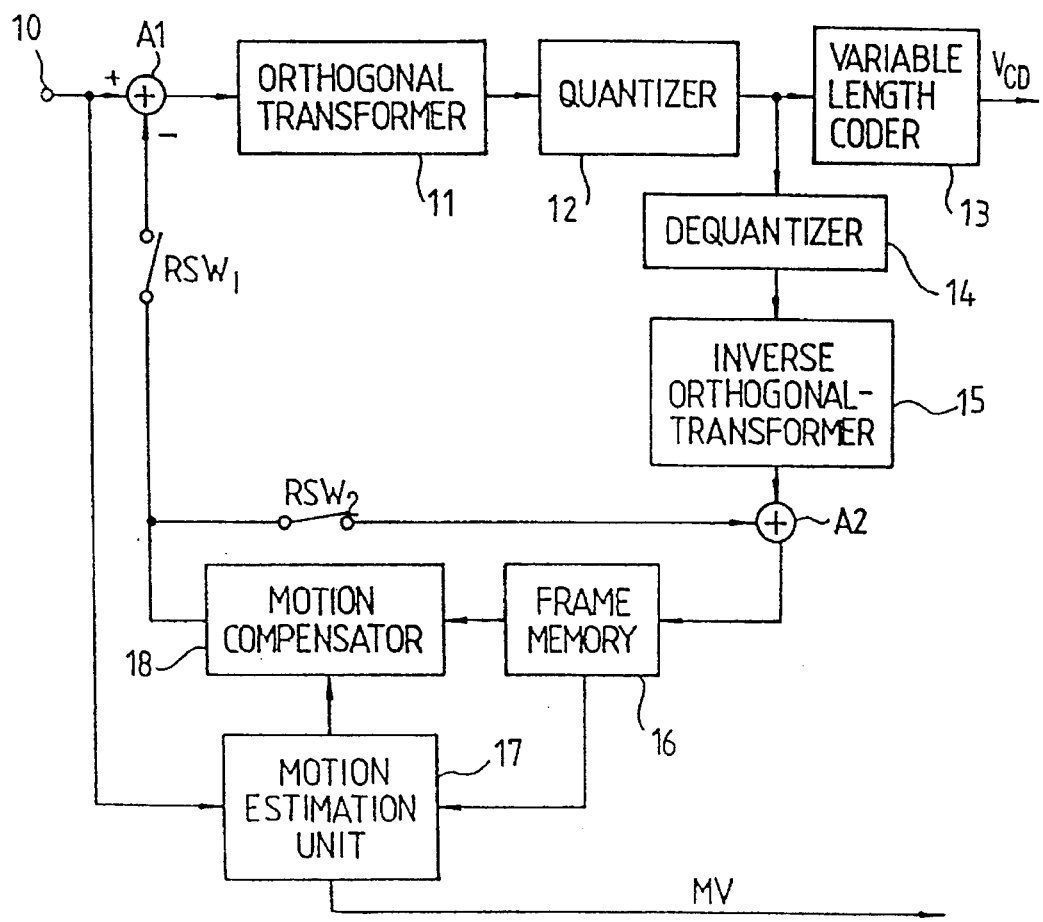
FIG. 1 is a block diagram illustrating a conventional video data coder.
Figure 2:
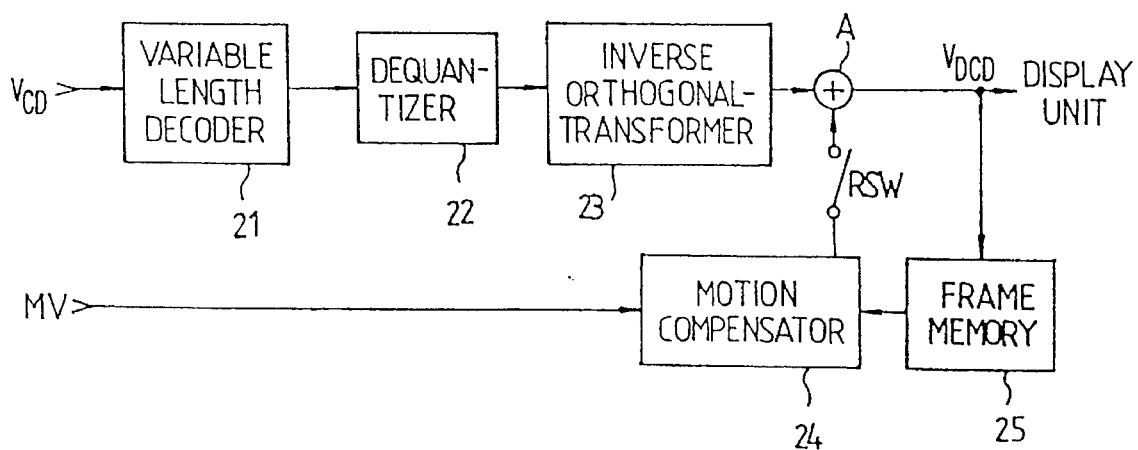
FIG. 2 is a block diagram illustrating a conventional video data decoder.
Figure 3:
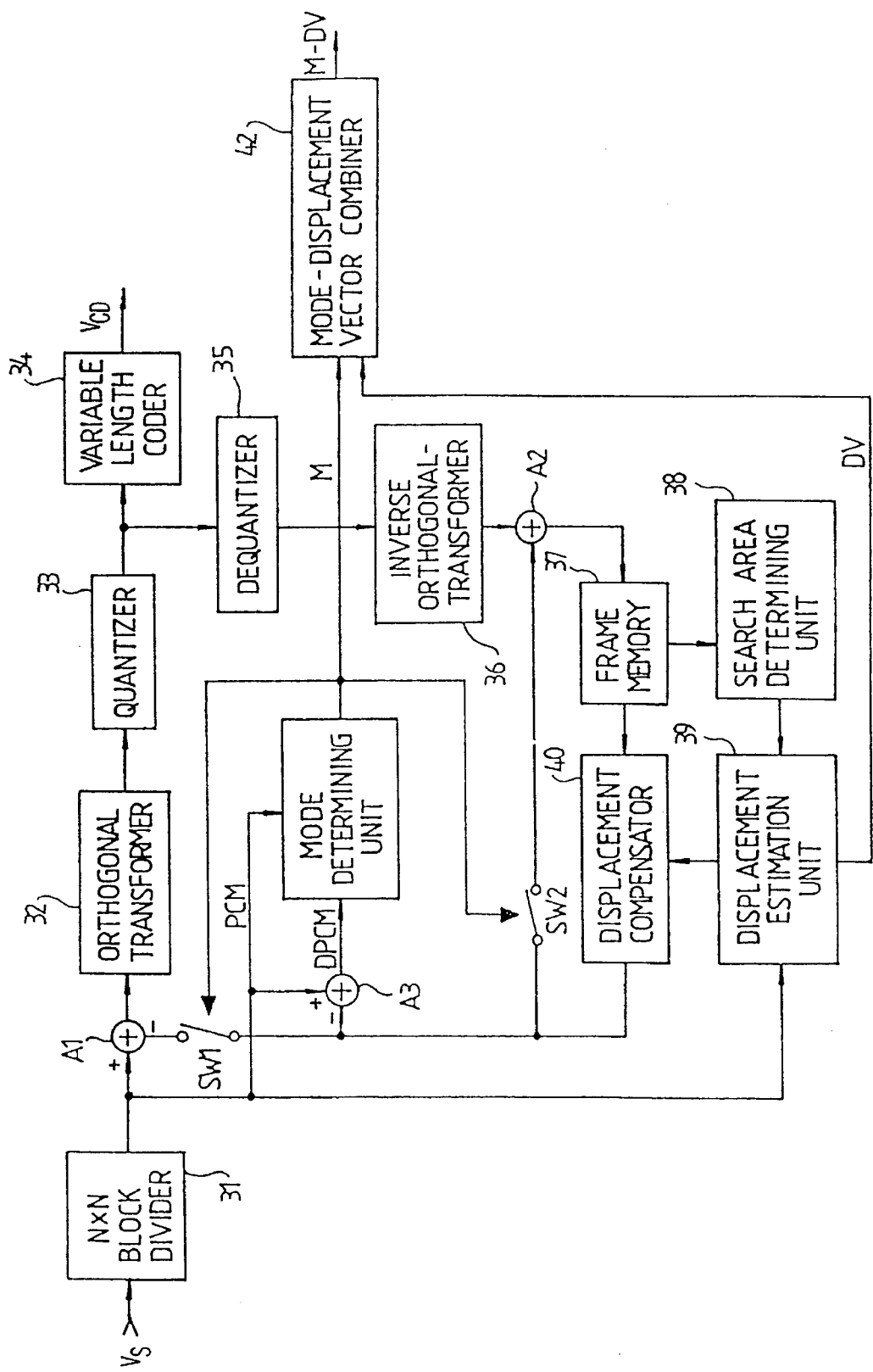
FIG. 3 is a block diagram showing a preferred embodiment of a coder according to the present invention.

Referring to FIG. 3, there is shown a coder including a block divider 31 for dividing each frame of video data into blocks of N×N size, an orthogonal transformer 32 for transforming the input block data into transformation coefficients, a quantizer 33 for quantizing the transformation coefficients, a variable length coder 34 for coding the quantization coefficients according to a variable length coding method, a dequantizer 35 for dequantizing the quantization coefficients output from the quantizer 33, an inverse orthogonal-transformer 36 for transforming the dequantized transformation coefficients to data in the spatial domain, a frame memory 37 for storing the reconstructed frame data, a search area determining unit 38 for determining the search area in the frame data, a displacement estimation unit 39 for estimating relative position of the most similar pattern of a block relative to a present block to be coded within the predetermined search area, and calculating a displacement vector DV, a displacement compensator 40 for reading the corresponding block from the frame memory 37 according to the estimated displacement, an adder A3 for calculating the difference between PCM data of the present block and the PCM data output from the displacement compensator 40, and outputting the DPCM data, a mode determining unit 41 for determining a predetermined mode according to a result of comparing the PCM data of the present block with the DPCM data output from the adder A3, and a mode-displacement vector combiner 42 for combining the mode data M output from the mode determining unit 41 and the displacement vector DV supplied from the displacement estimation unit 39.

For a still image or active image input to the coder of FIG. 3, the block divider 31 divides the input data into a plurality of blocks. The first adder A1 subtracts the feedback block data from the block data supplied from the block divider 31.

Figure 4:
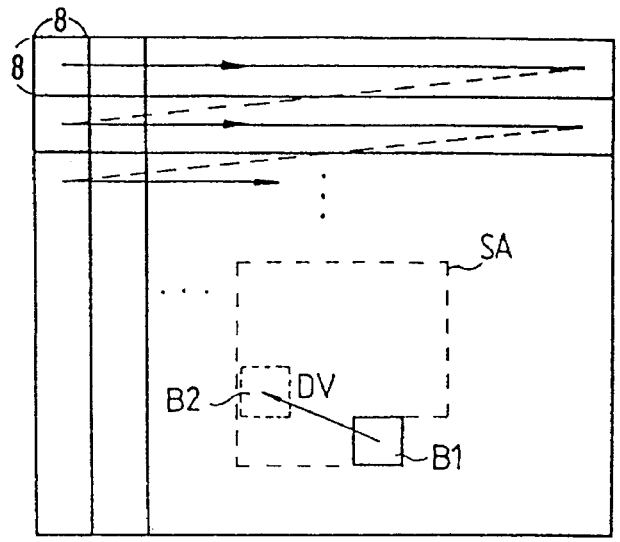
FIG. 4 is a schematic diagram explaining the operation of the coder of FIG. 3.

The feedback may be a block of data or no data. The output data from the first adder A1 is transformed into transformation coefficients in the frequency domain by the orthogonal transformer 32. The transformation coefficients are then quantized to predetermined representative values by the quantizer 33, and thereafter compressed by the variable length coder 34. At the same time, the quantization data output from the quantizer 33 is reconstructed to video data in the spatial domain by the dequantizer 35 and inverse orthogonal-transformer 36. The output of the inverse orthogonal-transformer 36, which corresponds to the output data of the above first adder A1, is added to the feedback data by the second adder A2. Here, the feedback data may be a block of data or no data, similar to that described above with respect to the first adder A1. The block data that is output from the second adder A2 is input to the frame memory 37, and the frame memory 37 sequentially stores the blocks to reconstruct a frame of data. The search area determining unit 38 sets a predetermined search area SA in the frame data which is stored in the frame memory 37. The search area SA includes the present block B1 to be coded as illustrated in FIG. 4, and is set to previous coded blocks. The displacement estimation unit 39 searches for the most similar pattern between block B2 and the present block B1 within the search area set by the search area determining unit 38, and estimates a relative position between the block B2 and the present block B1, thereby calculating the displacement vector DV. Here, either mean square error or mean absolute error is used in order to calculate the displacement. The displacement compensator 40 reads the block corresponding to the displacement vector DV from the frame data, which is stored in the frame memory 37, namely, the block B2 having a similar pattern with the present block B1 according to the displacement vector DV from the displacement estimation unit 39. The similar block data B2 is subtracted from the PCM data of the present block B1 by the third adder A3, the sum being a DPCM data block. Moreover, the data output from displacement compensator 40 is applied to the first adder A1 via the first switch SW1 and to the second adder A2 via the second switch SW2. Accordingly, the output data from the displacement compensator 40 is transmitted to the first and second adders A1, A2 when the switches are closed or cut-off when the switches are open. On the other hand, the mode determining unit 41 compares the DPCM data supplied from the third adder A3 with the PCM data of the present block B1 supplied from block divider 31. Then, the two data are compared based on the energy level magnitude. The mode corresponding to the data with the lowest energy level is thus determined. That is, the mode determining unit compares the DPCM data of the third adder A3 with the PCM data of the present block, in the case that the energy level of the PCM data is lower than that of the DPCM data, the mode determining unit 41 selects the PCM mode and outputs "0" as mode data M. On the other hand, in the case that the energy level of the DPCM data is lower than that of the PCM data, the mode determining unit 41 selects the DPCM mode and outputs "1" as mode data M. According to the mode data M of the mode determining unit 41, the ON/OFF state of the first and second switches SW1, SW2 are controlled. When the mode data is "0", namely PCM mode, the first and second switches SW1, SW2 are in the "OFF" state so that feedback data is not supplied to the first and second adders A1, A2. When the mode data is "1", namely DPCM mode, the first and second switches SW1, SW2 are in the "ON" state so that feedback data is supplied to the first and second adders A1, A2, respectively. In addition, the mode-displacement vector combiner 42 combines the mode data M of the mode determining unit 41 and the displacement vector DV of the displacement estimation unit 39, and outputs the mode-displacement vector data M-DV. The mode-displacement vector data M-DV differentially constitutes the data according to each of the modes. In the PCM mode, the mode-displacement vector data M-DV has only one mode data M of "0", as there exist no displacement data DV. In the DPCM mode, the mode-displacement vector data M-DV includes the mode data M of "1", and the displacement vector DV calculated from the displacement estimation unit 39.

In the coder of FIG. 3, the variable length coding unit 34 outputs PCM data which is coded by variable length coding or DPCM data according to the current mode. The mode-displacement vector combiner 42 outputs the mode-displacement vector data M-DV showing a mode state and a displacement vector. The coding data output from the coder is transmitted via a transmission channel and applied to a decoder in a receiver.

Figure 5:
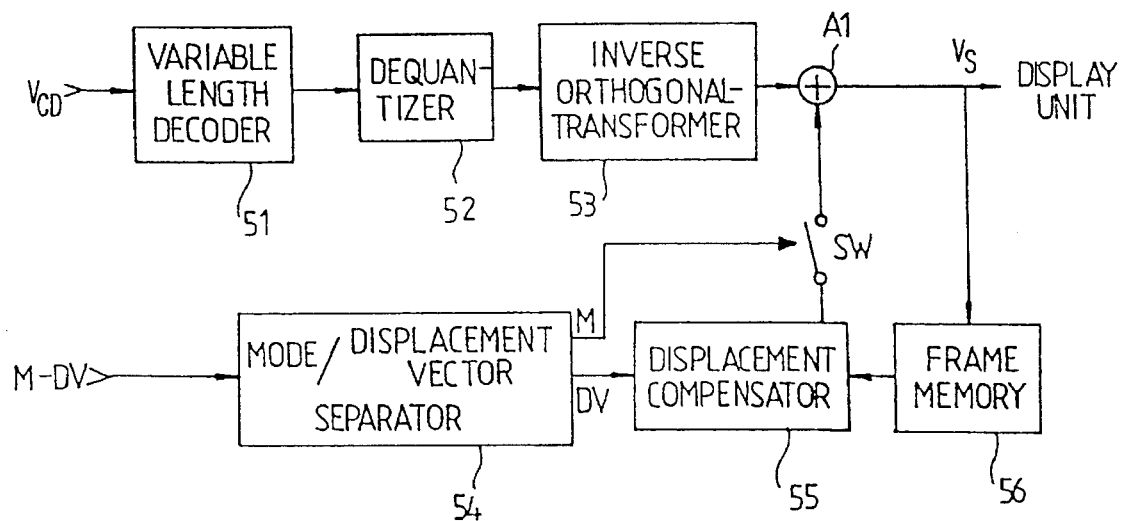
FIG. 5 is a block diagram illustrating a preferred embodiment of a decoder according to the present invention.

FIG. 5 shows a preferred embodiment of a decoder according to the present invention. The decoder includes a variable length decoder 51 for variable-length-decoding the video data $V_{CD}$ and outputting quantization coefficients, a dequantizer 52 for dequantizing the quantization coefficients, an inverse orthogonal-transformer 53 for inverse-transforming dequantized transformation coefficients to video data in the spatial domain, a mode-displacement vector separator 54 for receiving mode-displacement vector data M-DV transmitted from the coder and separating them into mode data M and displacement vector DV, a displacement compensator 55 for reading corresponding block data from a frame memory 56 according to the input displacement vector DV, a switch SW which is responsive to the mode data M, an adder A1 for adding the output data from the inverse-orthogonal transformer 55, and outputting the block data $V_s$ corresponding to the original still image, and a frame memory 56 for storing the frame reconstructed by the output data from the adder.

The coded video data is applied to the variable length decoder 51 which produces quantization coefficients. The quantization coefficients are transformed to video data in the spatial domain via the dequantizer 52 and inverse orthogonal-transformer 53. The mode-displacement vector separator 54 divides the mode-displacement vector data M-DV transmitted from the coder into mode data M and the displacement vector DV. In the PCM mode, the mode-displacement vector separator 54 outputs "0" as mode data M, and there exist no displacement data DV. The switch SW, which is controlled by the mode data M, is in the "OFF" state, so that the PCM block data, which is output from the inverse orthogonal-transformer 53, is stored in the frame memory 56 via adder the A1 and it is simultaneously transmitted to the display unit.

On the other hand, in the DPCM mode, the mode-displacement vector separator 54 outputs "1" as the mode data M, and outputs the displacement vector DV as calculated from the displacement estimation unit 39 in the coder. The displacement compensator 55 receives the block corresponding to the displacement vector DV from the frame data which is stored in the frame memory 56 and supplies it to the adder A1. At this time, since the mode data is "1", the switch is in the "ON" state, and the output data from the displacement compensator 55 is transmitted to the adder A1. The adder A1 combines the DPCM data supplied from the inverse orthogonal transformer 53 with the block data supplied from the displacement compensator 55, stores the sum in the frame memory 56, and simultaneously transmits the sum to the display unit.

Figures 6A, 6B:
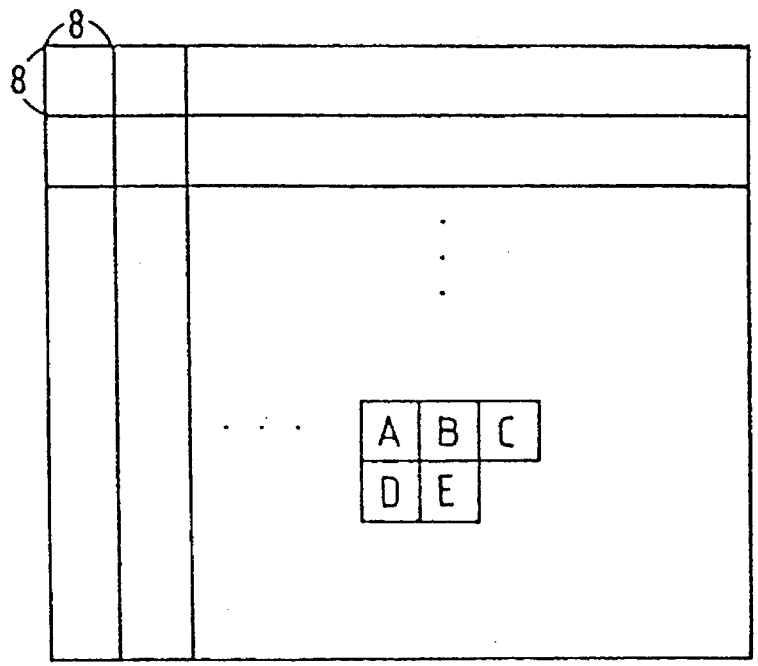
FIGS. 6A and 6B are schematic diagrams illustrating the operation of a preferred embodiment of the present invention.

FIG. 6 illustrates the case of obtaining a mode-displacement vector from a reconstructed frame. In FIG. 6A, the search area is determined with blocks A, B, C, D being closely adjacent to the present block E for coding among blocks stored in the frame memory after being coded. Thereafter, the difference between the block E for coding and the adjacent blocks A, B, C, D are calculated. In FIG. 6B, the energy level differences of each of the blocks E-A, E-B, E-C, E-D, that is, "$E_{E-A}$", "$E_{E-B}$", "$E_{E-C}$", "$E_{E-D}$", are respectively calculated. As there are four blocks being closely adjacent to the block E, each of the displacement data is represented as a two bit value. FIG. 6B shows the displacement data for representing the displacement as a two bit value between the block E for coding by the DPCM mode and adjacent blocks. The above displacement estimation unit selects the lowest one of the four energy differences $E_{E-A}$, $E_{E-B}$, $E_{E-C}$, $E_{E-D}$ and outputs the two bit displacement data value corresponding to the lowest energy level difference. Then, the displacement compensator reads the block data that has the lowest energy level difference compared to the present block data being coded from the frame memory according to the displacement data. The mode determining unit compares the PCM data of the present block with the DPCM data, which is a difference data between the present block E and the block being most similar based on the energy level. The unit then determines the mode, PCM mode or DPCM mode, according to the result of the comparison. After the mode is determined, the mode data and displacement data are combined and outputted by the mode-displacement combiner. The mode-displacement data transmitted from the coder has the data format as illustrated in FIG. 6B. In the PCM mode, only the mode data of "0" is transmitted. In the DPCM mode, the mode data of "1" and displacement data are transmitted.

As described above, the present invention provides a system for coding and decoding video data by detecting a block of data having a pattern similar to a present block to be coded for a still image or active image which is coded by intraframe coding, and for performing block DPCM in consideration of correlations between the two blocks in order to achieve maximum compression of the video data.

There has thus been shown and described a novel apparatus and method for coding/decoding video data which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A coder for compressing data, comprising:

block dividing means for dividing a frame of data into blocks of predetermined sizes, and outputting original data blocks;

coding means, coupled to said block dividing means, for coding each of said original data blocks according to a predetermined algorithm, and outputting coded data blocks;

reconstruction means, coupled to said coding means, for reconstructing each of said coded data blocks, and outputting reconstructed data blocks corresponding to said original data blocks;

a frame memory, coupled to said reconstruction means, for storing a frame of data based on said reconstructed data blocks;

search area determining means, coupled to said frame memory, for selecting a predetermined number of said reconstructed data blocks stored in said frame memory so as to define a search area;

displacement estimation means coupled to said search area determining means for receiving said selected number of reconstructed data blocks, and coupled to said block dividing means for receiving a present data block, said displacement estimation means determining by estimation which one of said reconstructed data blocks has a pattern similar to said present data block, and calculating a displacement vector based on said estimation;

displacement compensation means, coupled to said frame memory and to an output of said displacement estimation means, for receiving and outputting the data block from said frame memory having the pattern similar to said present data block based on said output of said displacement estimation means;

a first adder, coupled to said block dividing means and said displacement compensation means, for calculating differential data based on said present data block and the data block output by said displacement compensation means;

mode determining means, coupled to said first adder and said block dividing means, for determining a mode by comparing said present data block with said differential data, and outputting a corresponding mode value; and means, responsive to said mode value output by said mode determining means, for selecting one of said present data block and said differential data according to the mode value; and inputting said selected one of said present data block and said differential data to said coding means for coding.

2. A coder as defined in Claim 1, further comprising a mode-displacement vector combiner, coupled to said mode determining unit and said displacement estimation means, for combining said displacement vector and said mode value.

3. A coder as defined in Claim 1, further comprising a second adder having a first input coupled to an output of said reconstruction means, and a second input; and switching means having an input coupled to an output of said displacement compensation means, and an output coupled to said second input of said second adder, said switching means being responsive to said mode value; and said second adder supplying the output of said reconstruction means or the sum of the outputs of said reconstruction means and said displacement compensation means to said frame memory in accordance with said mode value.

4. A coder as defined in claim 3, wherein said switching means is turned off when said mode value equals a first predetermined mode value, and is turned on when said mode value equals a second predetermined mode value.

5. A coder as defined in claim 1, wherein said coding means comprises:

an orthogonal transformer, coupled to said block dividing means, for transforming each data block into transformation coefficients;

a quantizer, coupled to said orthogonal transformer, for quantizing said transformation coefficients and outputting quantization coefficients; and a variable length coder, coupled to an output of said quantizer, for coding said quantization coefficients according to a variable length coding technique.

6. A coder as defined in claim 1, wherein said reconstruction means comprises:

a dequantizer, coupled to said output of said quantizer, for dequantizing said quantization coefficients; and an inverse-orthogonal transformer, coupled to an output of said dequantizer, for transforming said dequantized transformation coefficients.

7. A coder as defined in claim 1, wherein said search area is composed of data blocks positioned adjacent to said present data block within said frame of data.

8. A coder as defined in claim 1, wherein said mode determining means comprises:

means for comparing an energy level of said present data block with an energy level of said differential data; and means for outputting a first mode value when the energy level of said present data block is less than that of said differential data, and a second mode value when the energy level of said differential data is less than that of said present data block data.

9. A coder as defined in claim 1, further comprising switching means having a first terminal coupled to an output of said displacement compensation means, and a second terminal, said switching means being responsive to said mode value; and a second adder having a first input coupled to said block dividing means and a second input coupled to said second terminal of said switching means, said second adder supplying the output of said block dividing means or the sum of the outputs of said block dividing means and said displacement compensation means to said coding means in accordance with said mode value.

10. A coder as defined in claim 9, wherein said switching means is turned off when said mode value equals a first predetermined mode value, and is turned on when said mode value equals a second predetermined mode value.

11. A decoder for decoding data which has previously been coded by a coder, said coder outputting coded data blocks having been coded according to a predetermined coding algorithm, and a mode value and a displacement vector for data being coded based on a similarity between first and second data blocks, said decoder comprising:

an input terminal for receiving the coded data blocks, the mode value, and the displacement vector;

decoding means, coupled to said input terminal, for decoding the coded data blocks according to a predetermined algorithm, and outputting decoded data blocks;

separation means, coupled to said input terminal, for separating said mode value and said displacement vector from said coded data blocks;

switching means having first and second terminals, said switching means being responsive to said mode value;

an adder having a first input coupled to an output of said decoding means and a second input coupled to said first terminal of said switching means;

a frame memory, coupled to an output of said adder, for storing a frame of data based on said decoded data blocks; and a displacement compensation means, coupled to an output of said separation means and said frame memory, for receiving a data block from said frame memory corresponding to said displacement vector received from said separation means, and applying said data block to said second terminal of said switching means, wherein said adder selectively adds the output data block from said displacement compensation means to an output of said decoding means in accordance with said mode value.

12. A decoder as defined in claim 11, wherein said separation means outputs said mode value having a first predetermined mode value corresponding to data being coded in the coder according to the predetermined coding algorithm, and having a second predetermined mode value corresponding to data being coded based on a similarity between the first and second data blocks.

13. A method for compressing data comprising the steps of:

(a) dividing a frame of data into blocks of predetermined sizes, and outputting original data blocks;

(b) coding each of said original data blocks according to a predetermined algorithm, and outputting coded data blocks;

(c) reconstructing each of said coded data blocks, and outputting reconstructed data blocks corresponding to said original data blocks;

(d) storing a frame of data based on said reconstructed data blocks;

(e) selecting a predetermined number of said reconstructed data blocks stored in said frame memory so as to define a search area;

(f) determining, by estimation, which one of said reconstructed data blocks has a pattern similar to a present data block, and calculating a displacement vector based on said estimation;

(g) selecting, as a selected data block, the data block having the pattern similar to said present data block based on said displacement vector;

(h) calculating differential data based on said present data block and said selected data block;

(i) determining a mode by comparing said present data block with said differential data, and outputting a corresponding mode value; and (j) coding one of said present data block and said differential data according to the mode value.

14. A coding method as defined in claim 13 further comprising the step of combining said mode value with said displacement vector into a data pack.

15. A coding method as defined in claim 13, wherein said search area is composed of data blocks positioned adjacent to said present data block.

16. A coding method as defined in claim 13, wherein said mode determining step (i) comprises the steps of:

comparing energy levels of said present data block and of said differential data;

setting said mode value to a first mode value when the energy level of said present data block is less than that of said differential data; and setting said mode value to a second mode value when the energy level of said differential data is less than that of said present data block.

17. A coding method as defined in claim 16, wherein said coding step (b) comprises the steps of coding said present data block when said mode value equals said first mode value, and coding said differential data when said mode value equals said second mode value.

18. A coding method as defined in claim 16, wherein said storing step (c) comprises the steps of: storing reconstructed data blocks when said mode value equals said first mode value, and storing differential data when said mode value equals said second mode value, said differential data equals to said reconstructed data plus the data block selected by selecting step (g).

19. A method for decoding data which has previously been coded by a coder, said coder outputting coded data blocks having been coded according to a predetermined coding algorithm, and a mode value and a displacement vector for data being coded based on a similarity between first and second data blocks, said method comprising the steps of:

(a) receiving the coded data blocks, mode value, and displacement vector;

(b) decoding the coded data blocks according to a predetermined algorithm, and outputting decoded data blocks;

(c) separating said mode value and said displacement vector from said coded data blocks;

(d) storing a frame of data based on said decoded data blocks in a frame memory;

(e) selecting a data block from said frame memory corresponding to said displacement vector; and (f) adding, selectively in accordance with said mode value, said decoded data blocks to said selected data block to produce original data blocks.

20. A decoding method as defined in claim 19, wherein said separating step (c) comprises the steps of: outputting said mode value having a first predetermined mode value corresponding to data being coded in the coder according to the predetermined coding algorithm, and outputting said mode value having a second predetermined mode value corresponding to data being coded based on a similarity between the first and second data blocks.

21. A decoding method as claimed in claim 19, further comprising the step of: outputting said decoded data blocks when said mode value equals said first mode value, and outputting a sum of said decoded data block and selected data block when said mode value equals said second mode value.

* * * * *